Feb. 7, 1950  J. DUBOURG  2,496,523
APPARATUS FOR CONTACTING SOLIDS WITH FLUIDS
Filed Aug. 6, 1948  3 Sheets-Sheet 3
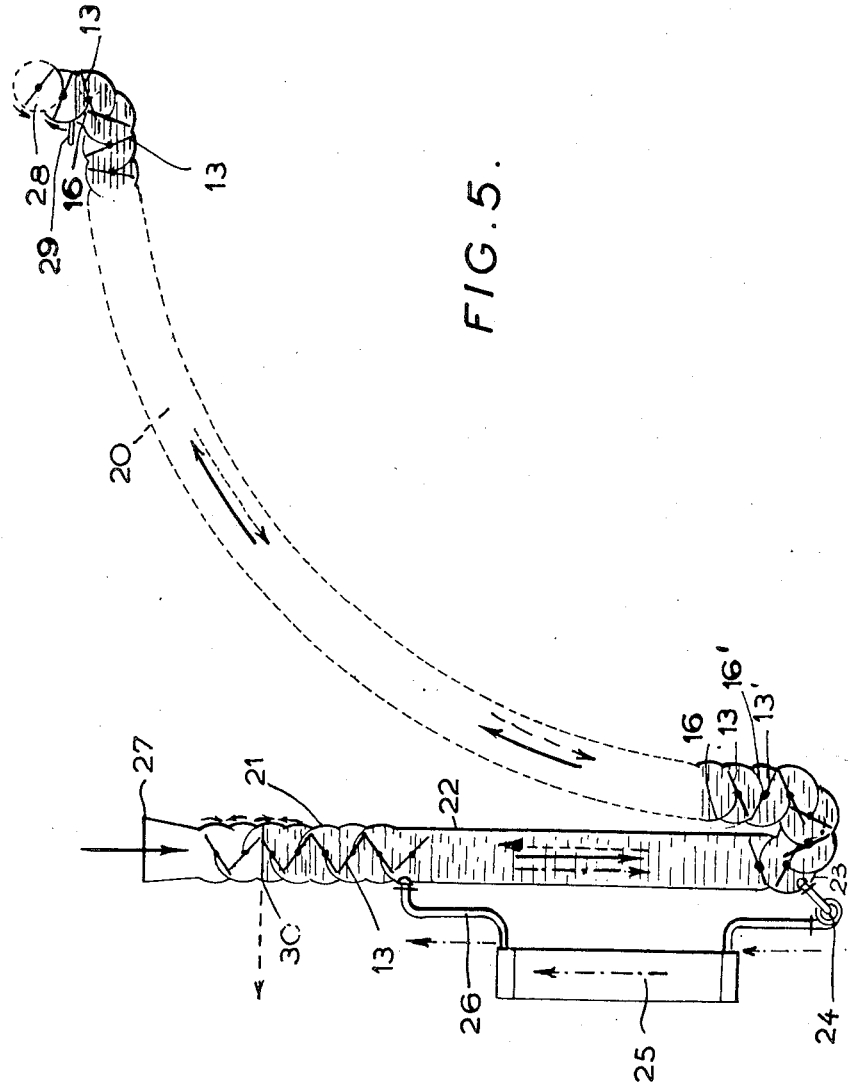
INVENTOR
JEAN DUBOURG Patented Feb. 7, 1950

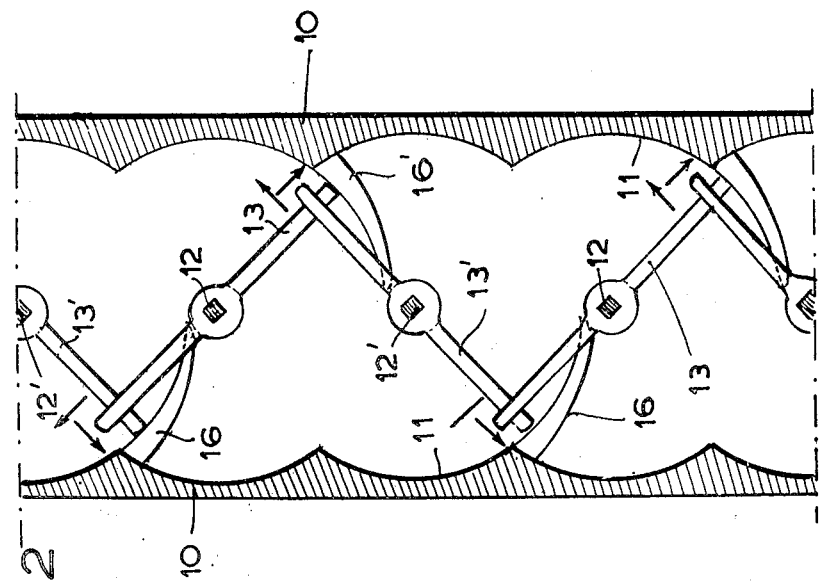
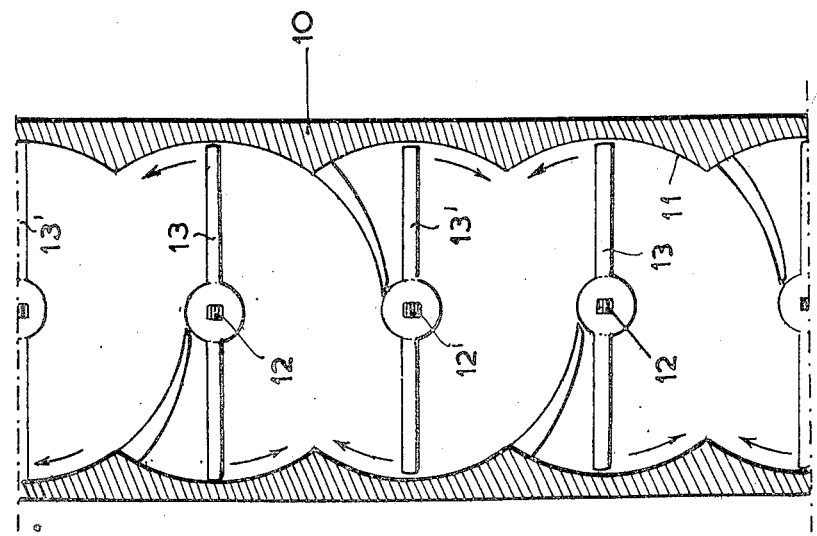

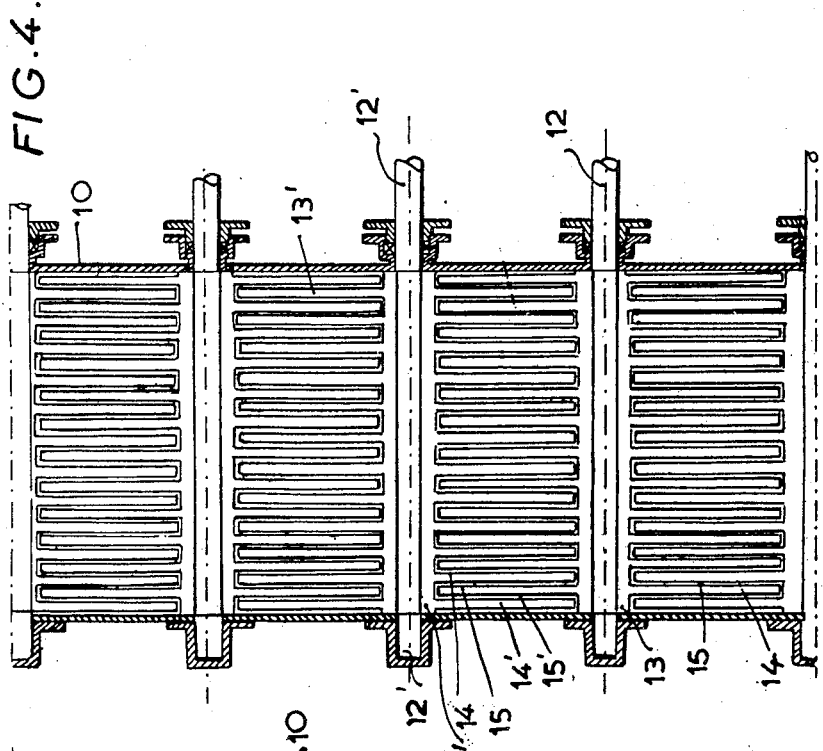
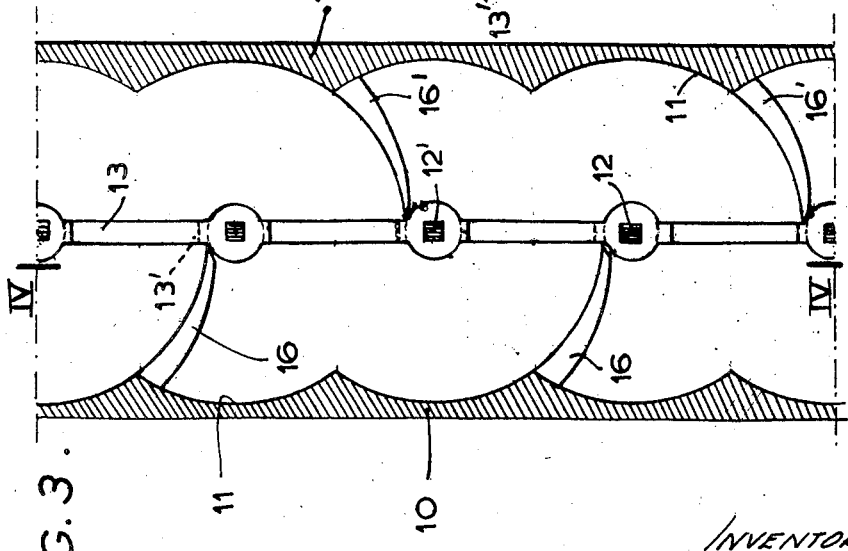

2,496,523

UNITED STATES PATENT OFFICE 2,496,523

APPARATUS FOR CONTACTING SOLIDS WITH FLUIDS

Jean Dubourg, Paris, France

Application August 6, 1948, Serial No. 42,878
In France August 18, 1947

5 Claims. (Cl. 127—7)

This invention relates to a device for the continuous treatment of divided solid materials, such as wood chips, chopped straw, beet root chips or pulp, oleaginous substances, vegetables, mark, and the like, with a stream of fluid, such as a liquid, gas or vapour.

Continuous processing of solid materials of the above character involves a continuous displacement or feed of the substance undergoing treatment while the fluid serving the function of a processing agent is caused to flow in the same direction or in counter-flow relationship thereto. To obtain efficient operation, it is desirable that the divided substance undergoing treatment be distributed as uniformly as possible throughout the flow-section for the fluid stream and that the contact surfaces be continually renewed.

In connection with some types of processes, it is required that the solid materials be subjected to vertical upward flow. In conventional apparatus for this purpose, the solid materials are elevated in a sheath adapted to channelize the treating or processing fluid, movement of which is effected through the use of chains driving buckets or trays. Such feeding means however have serious drawbacks arising from the possibility of the chains breaking. They do not, moreover, provide for the renewal of the surface of the treated material which is in contact with the processing fluid.

In other types of operations, it is required for the solids to flow vertically downwardly at a controlled predetermined rate of feed. This feed displacement may be obtained by the use of the previously mentioned chain means provided with buckets or trays; alternatively, towers provided with trays may be used, through which the material is caused to drop from each tray to the next lower one, the material being, on each tray, subjected to the action of arms or plows moving it from the center to the periphery or from the periphery towards the center. The chain feed system has the drawbacks mentioned above. The tray-containing tower system does not readily provide for a mulling of the solids with the fluid; this system is unsuited where the solids have a specific gravity such as to float upon the surface of the processing liquid.

It is a general object of this invention to provide a material-handling or feeding device of the general character described, which is free of the above drawbacks.

It is another object of the invention to provide such a material-handling or feeding device wherein the solid materials to be handled will have a continuous and uniform progression imparted to them regardless of the character of the treating fluid used and regardless of the direction of the displacement, i. e. said displacements may be vertical upwards or downwards, inclined, horizontal, rectilineal or arcuate.

A practical embodiment of the invention will now be described by way of illustration and not of limitation with reference to the accompanying drawings wherein:

Figs. 1, 2 and 3 illustrate the device in cross-section for various consecutive positions of the rotary combs.

Fig. 4 is a cross-section on the line IV—IV of Fig. 3 illustrating the manner in which the teeth of the combs intermesh with each other.

Fig. 5 shows an application of the device to the diffusion of sugar from beet chips.

The invention provides a device which consists of a sequence of juxtaposed elements which together form a sheath through which the solid materials and the treating fluid are fed; each of said elements comprises a dual rotary comb member the teeth of which intermesh with the teeth of the comb of the adjacent element. The rotary combs moreover cooperate with fixed combs which are connected with the sheath and which allow the teeth of the rotary combs to pass therethrough.

Under the action of the rotary combs which are driven in a suitable direction; the solids are passed from one element to the next one where they are taken up by the comb-member of said next element, thus progressing in a regular and continuous fashion through all of the sequential elements. Owing to the action of the stationary combs the material passed by the rotary comb of one element into the next element is prevented from moving back in the opposite direction. It is retained in said next element to be at once picked up by the rotary comb-member of said next element and is thus caused to proceed along its path of feed.

With the device of the invention the material is caused to pass through the entire flow-section of the treating-sheath, being forced by the combs first in one direction, then in the other. Such movements ensure homogeneous distribution of the material and unceasing renewal of the contact surfaces thereof with the treating fluid.

In the form of embodiment shown in Figs. 1 to 4 the device as shown is vertically arranged, the material being assumed to travel upwardly. It is to be understood however that the device could be applied to a vertical downward displacement or a sloping displacement, or a horizontal displacement, both rectilineal or arcuate.

The device as shown comprises a sequence of elements in superposed relationship so as to form a continuous sheath 10 through which the solid materials are caused to be fed upwards while the treating fluid (a liquid or a gas) may be caused to flow upward or downward as desired.

Each element is rectangular in horizontal cross-section and is inwardly defined by cylindrical side-walls 11. At the center of each said cylinder there is mounted a shaft 12 or 12' on which is secured a dual comb member 13 or 13' rotated by said shaft 12 or 12'. The combs 13 or 13' are substantially equal in overall length to the diameter of the cylindrical portion 11. The spacing between the successive shafts 12, 12' is substantially equal to the length of one half of each rotary comb 13 or 13' and consequently to the radius of the cylindrical portions 11.

The consecutively arranged shafts 12, 12' which respectively drive the combs 13, 13' are alternately rotated in opposite directions, their movements being synchronized through suitable means not shown. Thus all of the combs are adapted simultaneously to assume a horizontal position (Fig. 1) or a vertical position (Fig. 3). In any intermediate position (as in Fig. 2) the combs 13 and 13' assume oppositely inclined angular positions. As clearly shown in Figs. 2 and 3 the combs 13 and 13' are adapted to cross each other. For this purpose (see Fig. 4) each comb is formed with teeth 14 between each pair of which there is a sufficiently wide gap for the teeth of the other comb to pass therethrough; thus the gaps 15 enable passage of the teeth 14' of the comb 13', while the gaps 15' allow passage of the teeth 14' of the comb 13', while the gaps 15' allow passage of the teeth 14 of the comb 13. At the junction of an adjacent pair of elements, at the point of connection between the elements of the cylindrical envelope 11 there is provided a fixed comb 16 or 16' of arcuate configuration. The comb 16 or 16' is formed with such a curvature as to extend the wall section 11 immediately above it. It extends substantially as far as a point adjacent the shaft 12 or 12' at the location where the tips of the teeth 14 (or 14') of the combs 13 (or 13') pass. The teeth of the fixed arcuate comb member 16 have a similar conformation to those of the rotary comb 13' of the adjacent element above it. They are adapted in a similar manner to allow the teeth 14 of the comb 13 to pass therethrough. Conversely the fixed arcuate combs 16' are formed with teeth similar to those of the rotary combs 13 enabling passage of the combs 13'.

As the combs 13, 13' are rotated in opposite directions, they cross each other, and the teeth 14, 14' thereof intermesh with each other without interfering with each other's movements. The rotary comb 13 passes through the fixed comb 16, but skirts the fixed comb 16' without passing through it. The comb 13' passes through the fixed comb 16' but travels alongside or skirts the comb 16 without passing through it.

The solid material in any one of the elements is raised by the comb 13 in its rotation and is pushed along by that comb so as to collect or gather upon the fixed comb 16.

While the rotary comb 13 is coming closer to the fixed comb 16 in its rotational movement, it is crossed by the rotary comb 13' immediately above it, the teeth 14' of which pass through the gaps 16 of the comb 13. The material intercepted by the fixed comb 16 is then picked up by the rotary comb 13' which carries it up with it in its movement to drop it onto the comb 16' whence it then is similarly carried up by a further comb 13.

In this way the solid materials are moved up through the sheath 10 step by step with a regular feed movement. In its upward travel the material traverses the entire free cross sectional area of the sheath alternately from right to left and from left to right, thereby being subjected to a continual stirring effect as a result of which the mass is homogenized and the surface of contact thereof with the treating fluid is constantly renewed.

The successive rotary combs 13, 13' are synchronously driven so as at all times to remain in symmetrical positions with respect to each other on either side of the mediatrix of the line connecting the centers of rotation 12, 12' thereof. The combs are driven from an external drive means through any appropriate means: spur or bevel pinions, helical gears driven from worms mounted on a common shaft and provided with alternately opposite pitch angles, or any equivalent drive means may be used. The drive is provided by one or more motors arranged at suitable points of the apparatus. Rather than an upward feed for the solid materials a downward feed therefor may be provided through the use of a reverse arrangement from that shown, this being advantageous for instance when the materials are being treated with a liquid on the surface of which the material is adapted to float: the mechanical drive by the combs causes immersion of the solids and continuous downward feed thereof in opposition to the natural buoyancy thereof or its tendency to float.

A similar device is applicable to horizontal, inclined or arcuate paths of travel of the materials to be fed.

The invention is valuable in a wide field of applications, as for simple conveying operations, as well as for continuous processing operations using a liquid, a gas or a vapour in counter-flow to the substance undergoing treatment or in parallel flow relationship therewith.

Thus it may advantageously be used in solvent extraction steps, in sugar diffusion from beetroot chips, in the preparation of tan liquor, the extraction of fats and the like, in chemical processes such as alkaline or acid cooking of cellulose fibres, bleaching of cellulose pulps and the like, or further in air-drying or steaming processes.

One example of the application of the invention to a continuous diffusion of sugar from beetroot chips is shown by way of illustration in Fig. 5.

Use of the apparatus shown makes possible the fulfilment of the two essential requisites for this treatment, namely: heating the chips to a temperature of about 80° C. and upward circulation of the chips while a stream of water or juice passes downwardly through them, said juice increasing in concentration as it flows down.

Such a continuous diffusion process could be accomplished by the use of a vertical sheath of the type described in connection with Figs. 1 to 4, with the beet-root chips being fed at the bottom and with a downward vertical flow of water gradually converted into a sugar juice growing thicker and thicker as it proceeds on its downward flow.

It is known however that the variations in concentration along a diffusion apparatus follows a substantially logarithmic law of variation. In order that the juice at different vertical levels in the apparatus will have substantially corresponding difference; in concentration, it is desirable to impart to the treating sheath a logarithmic contour. Practically, the sheath 20 is formed as a quarter of a circumference comprising juxtaposed elements suitably conformed to obtain the desired curvature (Fig. 5).

Aside from the above-indicated advantages the construction of a continuous diffusor in the form of a quarter of a circumference has the further advantage of reducing the over-all vertical dimensions for a given length of the path of diffusion.

The diffusion sheath 20 is associated with a vertical feed and heating device for the beet-root chips which comprises a series of comb-containing elements 21 similar to the previously described elements, but effecting a downward feed and immersion of the materials, a smooth vertical tube 22, a second series of comb-carrying elements 23 merging with the circular rising sheath 20. At the level of the elements 23 there is mounted a pump 24 adapted to draw the juice in, forcing it to flow through a reheater 25 and discharging the warm juice through the conduct 26 into the top of the tube 22 (as shown by the solid arrows in the figure).

The chips are introduced at 27 into the series of elements 22 where they are immersed into the juice, and carried by the rotary combs upwards until they enter the smooth tube 22. In the tube 22 they are brought to the desired elevated temperature by the juice recycled at 26 through the reheater 25, and the chips are moreover taken up by the down current induced by the pump 24 and the recycled juice at 26 (see the dot-and-dash arrows).

From the elements 23 the warm beet-root chips are fed into the treating sheath 20 and are passed therein from each element thereof to the next one, under the driving action of the rotary combs, until they finally emerge at 28 in the condition of exhausted pulp stripped of its sugar content.

The liquid flows in the opposite direction. The water is fed at 29 near the outlet for the pulp and flows down through the sheath 20 gradually becoming more and more rich in dissolved sugar content, in the direction indicated by the arrows in dash-lines in the figure. This downward flow is effected in the direction of increasing juice concentration, and therefore of increasing specific gravity of the juice.

In the vertical section 21—22—23 the circulating fluid is sugar juice. It reaches the level 30 which compensates for the height of the liquid in the diffusor 20 with the loss of head sustained in the latter.

Rather than a quarter-of-a-circumference as shown in Fig. 5, the continuous diffusor can be constructed in two or more arcuate sections of identical height juxtaposed with each other, and interconnected with vertical tubes similar to the element 22. Generally speaking, any combination of linear and arcuate sections comprising rotary comb-carrying elements in juxtaposed assembly may be used according to the invention, the particular arrangement used depending on the type of treatment desired, considerations of space requirements and other factors, the device being readily adaptable to each individual case.

The necessary heat may be supplied in various points along the flow circuit, by means of an external system including a pump and a heat-exchange means.

What I claim is:

1. Device for treating divided solid materials with a fluid which comprises a vertical sheath member rectangular in cross section having two opposite flat side walls and the two remaining side walls formed by a succession of dual cylindrical segments, with the two corresponding segments in opposite relationship and having a common horizontal axis; within each dual cylindrical segment a dual comb member adapted for rotation about said common axis and substantially equal in length to the diameter of said dual segment, each two successive dual combs being adapted for rotation in reverse directions at a common speed of rotation symmetrically with respect to a horizontal plane equidistant from the respective axes thereof and having their comb-teeth staggered to allow the teeth of one of said combs to pass in between the teeth of the other, the spacing between the axes of any two successive dual combs being substantially equal to one half the length of said dual comb, curved comb members secured to said sheath at the end of said cylindrical segments as an extension thereof and alternately on either side of said sheath and extending as far as the shaft of rotation of that dual comb which is immediately below it and having the comb teeth thereof in staggered relationship to allow the teeth of said dual comb to pass therethrough.

2. Device as in claim 1 wherein said vertical sheath has an arcuate profile, and any two consecutive dual combs are adapted to rotate symmetrically with respect to a plane that is equispaced from the respective axes thereof.

3. Device as in claim 1 wherein the vertical sheath comprises both vertical restilineal sections and arcuate sections.

4. Device for continuous counter-flow treatment of beet root chips with water to extract sugar therefrom which comprises, a straight vertical sheath into and through which said chips are adapted to be fed downwardly, followed by a curved vertical sheath into and through which said chips are adapted to be fed upwardly, each said sheath having a rectangular cross-section, and having two flat opposite sides and the two remaining sides formed by a succession of opposite dual cylindrical segments having common horizontal axes, within each dual cylindrical sheath a dual comb member adapted for rotation about the axis of said segment and substantially equal in length to the diameter of said dual cylindrical segment, two successive dual combs being adapted for rotation in reverse directions at a common speed and having their comb-teeth in staggered relationship to allow the teeth of one to pass in between the teeth of the other, the spacing between the axes of any two dual combs being substantially equal to one half the length of said dual comb, curved combs secured to said sheath at the end of said cylindrical segments and in alignment therewith alternately on either side of said sheath and extending as far as the shaft of the new downwardly related comb, and having the teeth thereof staggered to allow the teeth of said dual comb to pass therethrough.

5. Device as in claim 4 wherein said straight vertical sheath adapted for downward feed of the chips comprises movable dual combs and fixed combs only in an upper section thereof for introducing the chips into the treating liquid, and below said upper section a tubular comb-free section connecting with an external circuit said circuit including a pump and a reheater to thereby induce through said tubular section a downward flow of treating liquid adapted to drive the chips into said curved upward-flow sheath member.

JEAN DUBOURG.

REFERENCES CITED

The following references are of record in the file of this patent:

UNITED STATES PATENTS

| Number | Name | Date |
|---|---|---|
| 651,840 | Fahrney | June 19, 1900 |
| 986,813 | Etherington | Mar. 14, 1911 |
| 1,317,215 | Pennock | Sept. 30, 1919 |

FOREIGN PATENTS

| Number | Country | Date |
|---|---|---|
| 49,546 | Sweden | July 6, 1921 |